May 30, 1950 M. L. RYSDON 2,509,455
HOG FOUNTAIN
Filed June 4, 1947 2 Sheets-Sheet 2
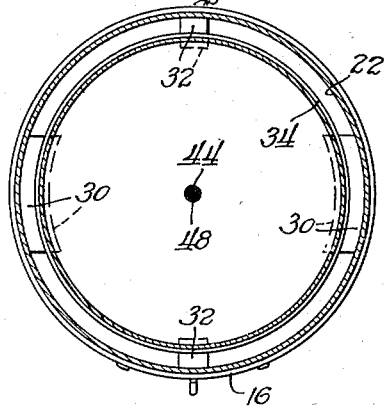
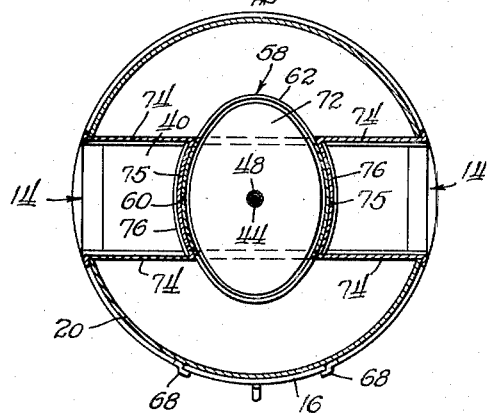
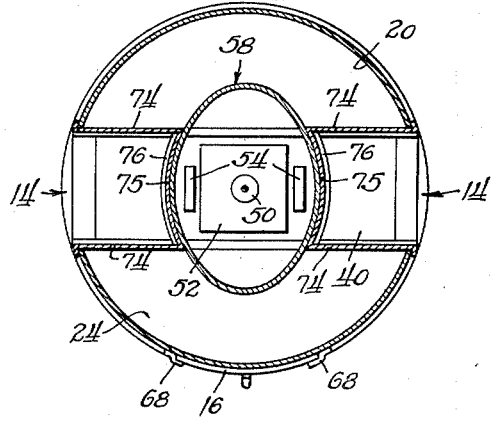
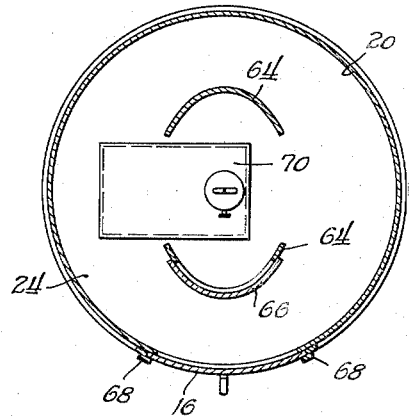
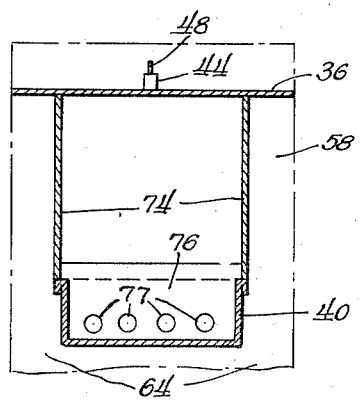
Inventor
Max L. Rysdon
By Bair & Freeman
Attys Patented May 30, 1950

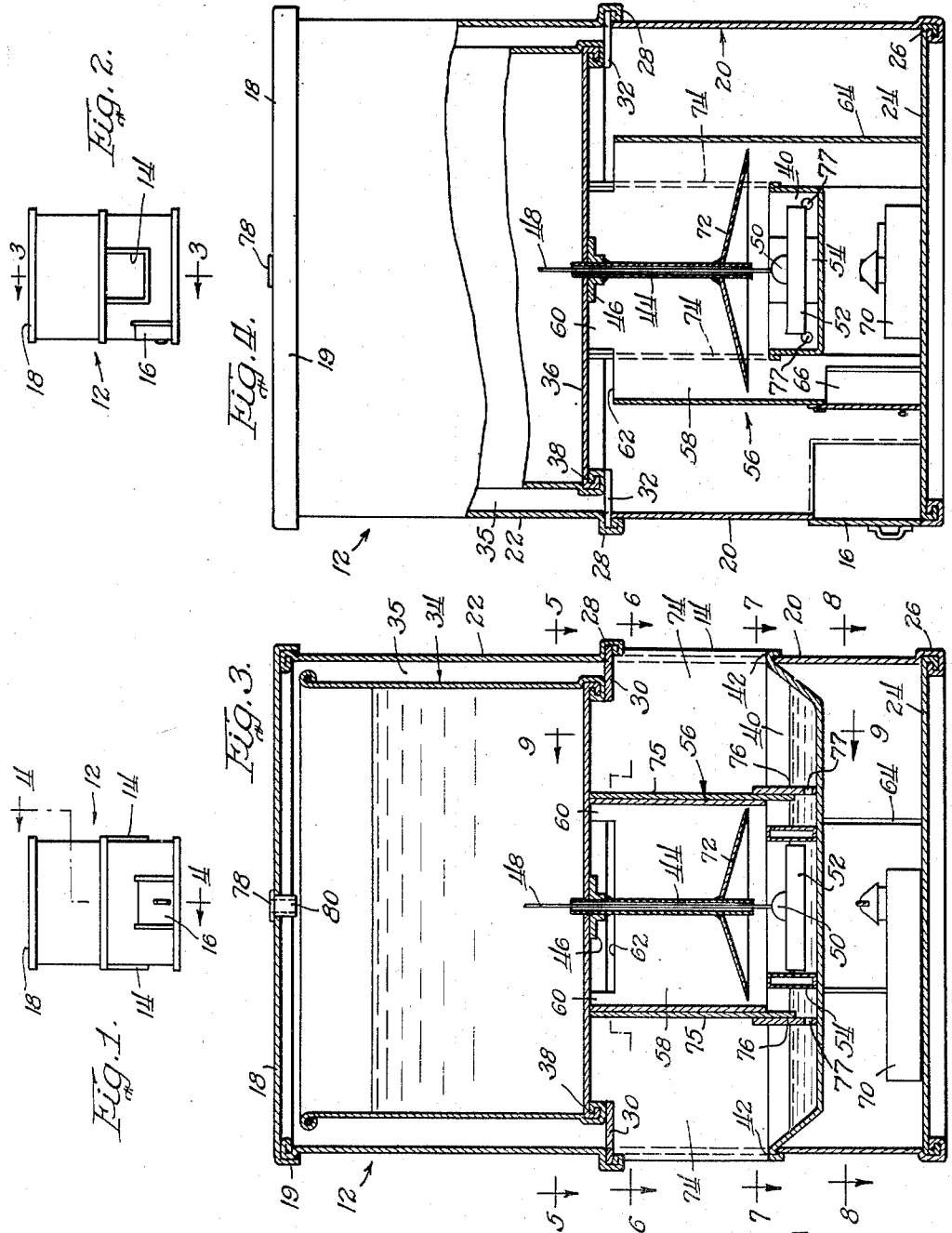

2,509,455

UNITED STATES PATENT OFFICE 2,509,455

HOG FOUNTAIN

Max L. Rysdon, Sioux Falls, S. Dak.

Application June 4, 1947, Serial No. 752,419

14 Claims. (Cl. 119—73)

This invention relates to fountains for animals such as hogs.

An object of the invention is the special construction of such a fountain for efficiently utilizing heat applied thereto by heating means for preventing freezing of the water in cold weather.

Another object of the invention is the provision of such a fountain which requires less heat for preventing its freezing than ordinary fountains.

A further object of the invention is the provision of an animal fountain having a plurality of drinking stations and in which a single heating means is employed for heating all drinking stations.

A still further object is to provide a single heating means for a drinking trough and its drinking stations, and the heated air which is applied to the drinking trough thereafter is applied to the supply container included in the fountain for supplying water to the trough.

Still another object of the invention is the provision of a fountain having a drinking trough of great area which can be heated by a single heating means.

Another object is the reduction of attention required for keeping the fountain in a heated condition.

A still further object is the application of heat at the central portions of the drinking trough so that the water heated thereby is circulated in the trough to the drinking stations at the ends of the trough.

Still another object is the provision of a shield or heat retention means for retaining heated air in a position adjacent the drinking trough.

A further object is the provision of means for retarding the escape of heat out of the fountain to prolong its heating effect on the water in the fountain.

The fountain of the present invention employs a conduit communicating between the supply container and the drinking trough, the flow of water in which is controlled by a float in the drinking trough.

A further object therefore of the present invention is the provision of means for concentrating heated air in a position adjacent said conduit.

Another object of the invention is the provision of agitator means in said conduit and extending into the supply container, which is actuated by the float in the drinking trough to further aid in preventing any freezing action in the container adjacent said conduit.

With these and other objects in view, my invention consists in the construction, arrangement and combination of the various parts of my device whereby the objects contemplated are attained as hereinafter more fully set forth, pointed out in my claims and illustrated in the accompanying drawing, wherein:

Figure 1 is a side elevational view of the fountain of my present invention;

Figure 2 is a view from the right of Figure 1;

Figure 3 is a vertical sectional view taken on line 3—3 of Figure 2;

Figure 4 is a view taken on line 4—4 of Figure 1;

Figure 5 is a horizontal sectional view taken on line 5—5 of Figure 3;

Figure 6 is a horizontal sectional view taken on line 6—6 of Figure 3;

Figure 7 is a horizontal sectional view taken on line 7—7 of Figure 3;

Figure 8 is a horizontal sectional view taken on line 8—8 of Figure 3; and

Figure 9 is a sectional view taken on line 9—9 of Figure 3.

Referring now in detail to the drawings, the fountain of my invention is illustrated in simple outline in Figures 1 and 2 and contains an outer shell 12, generally cylindrical in cross section, having openings 14 in opposite sides thereof, disposed toward the lower part of the shell. On one of the sides of the shell at the lower part there is a slide 16 for affording access to the interior of the shell. A cover 18 having a depending peripheral flange 19 is loosely supported on the top of the shell. The shell 12 is preferably of corrugated sheet metal to provide increased strength, but for purposes of simplification in drafting, it is shown as being non-corrugated.

Referring particularly to Figures 3 and 4 the shell 12 is made up of a lower section 20 and an upper section 22. The lower section 20 is provided with a bottom closure 24 secured to the bottom edge of the shell in a bead 26 as is usual in sheet metal work.

The two parts 20 and 22 of the shell 12 are secured together by a bead 28 formed of the meeting marginal edges of the respective parts. Plates 30 are secured in the bead 28, extending inwardly thereof, and are disposed on opposite sides of the shell 12. The plates 30 extend circumferentially of the shell a considerable extent, as illustrated in Figure 5, and inwardly of the shell only a short distance. Supporting brackets 32 are also secured in the bead 28 on opposite sides thereof and disposed transversely to the positions of the plates 30. The brackets 32 are of considerably less circumferential extent than the plates 30.

It will be understood that the sheet metal in the shell 12, and the other parts to be described hereinafter, are exaggerated in thickness in the illustrations, for ease in visualizing the construction. Actually the thickness represented may be much less. In other instances, parts may be illustrated in distorted proportions.

A supply container 34, also preferably of corrugated sheet metal, is mounted in the upper part of the shell 12, as illustrated in Figures 3 and 4. The container 34 is circular in cross section to conform with the shape of the shell 12, and is of reduced diameter to provide an annular space 35 therebetween. The container 34 is formed of a surrounding side wall, and a bottom 36 secured in the side wall in a bead 38. The container 34 is supported in the shell by means of the plates 30 and is retained against rocking by the brackets 32. The plates extend inwardly only sufficiently to support the container 34.

Mounted in the shell 12 below the supply container 34 is an elongated drinking trough 40 which is rectangular in cross section, having its ends supported on the lower marginal edges of the opposite openings 14. The bottom plate of the trough 40 is turned up to form end members of the trough and the extremities of the end members are turned over the lower edges of the openings 14, as indicated at 42. The trough has an open top, and the ends of the trough are in register with the openings 14 to form drinking stations on opposite sides of the fountain.

The drinking trough 40 has communication with the supply container 34 by means of a conduit 44 which has its upper end extending through the bottom of the container 34 and secured thereto by means of a sleeve 46. The lower end of the conduit 44 terminates shortly above the upper open side of the trough 40 and is disposed for discharging water from the container 44 into the trough 40.

An agitator or plunger 48 is loosely disposed in the conduit 44 and is long enough to have its upper end extending out of the upper end of the conduit 44 and into the container 34; and its lower end extends out of the lower end of the conduit 44. Secured to the lower end of the plunger 48 is a rounded valve member 50 having its upper surface rounded and adapted to engage and close the lower end of the conduit 44. The valve member 50 is preferably composed of rubber or other resilient material which is pliable and thereby adapted to effectively seal the lower end of the conduit 44.

A float 52 is disposed in the drinking trough 40 below the conduit 44. The float 52 is of large area to furnish considerable force for actuating the valve member 50. The float 52 is preferably disconnected from the valve member 50, but if desired they may have positive connection therebetween. Guide members 54 are secured to the bottom of the drinking trough 40 on opposite sides of the float 52 for centering the float in the trough, the float then being guided by the guide members 54 and the sides of the trough 40.

A baffle or deflector member indicated generally at 56 is positioned in the lower part of the shell 12 under the container 34. The baffle member 56 forms a tubular element 58 between the drinking trough 40 and the under surface of the bottom of the container 34. The tubular member 58 includes portions 60 extending substantially into contact with the container 34, and these portions 60 are disposed over the drinking trough 40. The remainder of the tubular member 58 terminates a short distance below the container 34, as indicated at 62, forming passages out of the tubular element 58.

The tubular element 58 is oval in cross section, as illustrated in Figures 6 and 7, with the longer transverse dimension thereof disposed transversely of the drinking trough 40. The side portions of the tubular element 58 which are disposed laterally of the trough 40 extend downwardly substantially into contact with the bottom 24 of the shell as indicated at 64, thus forming in effect a slot cut through the lower portion of the tubular element 58 in which the trough 40 is disposed. Formed in one of the downwardly extending portions 64 is a hinged door 66 adapted to swing outwardly therefrom for affording access to the space below the trough 40. The door 66 is in register with the slide 16 in the side of the shell 12. The slide 16 may be a simple slide held in place by side flanges 68 in which the slide 16 may be raised and lowered. An oil lamp 70 is shown in the space below the trough 40. The lamp 70 may be any convenient heating means and is disposed so that the heat therefrom is concentrated mostly in the central portion of the trough 40. The lamp 70 may be inserted into place and removed therefrom through the door 66 and the slide opening 16.

A cone shaped shield 72 is secured to the conduit 44 adjacent the lower end thereof and is thereby positioned a short distance above the upper side of the trough 40. The shield 72 is disposed with its concave side directed downwardly. The shield is oval in horizontal outline, similarly to the tubular element 58, and encompasses a substantial portion of the cross sectional area of the tubular member.

Plates or wall elements 74 are secured to the upper edges of the trough 40 between the tubular member 58 and the wall of the shell 12. Each pair of plates 74 disposed on respective sides of the tubular element 58 may be formed of a single piece of material, having an interconnecting portion 75 which is fitted against the tubular element 58. The plates 74 extend upwardly substantially in contact with the under surface of the container 34. The plates 74 being disposed at the lateral edges of the trough 40 and of the respective openings 14, and cooperating with the extensions 60 at the top of the tubular member 58, form cavities which substantially enclose the outer ends of the drinking trough 40 and seal them from the interior of the shell and expose them to the exterior through the openings 14. The plates 30 close the cavities from the annular space 35 between the shell 12 and the container 34.

The baffle member 56 may be considered as including the tubular element 58 and the plates 74.

Side pieces 76 are secured to the portions 75 and extend down into the drinking trough 40, and aid in securing the plates 74 in position. The pieces 76 are provided with holes 77 for the passage of water from the central part of the trough into the drinking stations at the ends thereof.

The cover 18 is provided with a central opening 78 and a tubular extension 80 surrounding and depending from the central opening 78.

The lamp 70, being positioned centrally of the drinking trough 40, concentrates heat at the central portion thereof. The water in the central portion of the trough which is thereby heated then circulates to the ends of the trough in the drinking stations and the whole trough is thereby heated from a single heating means. A portion of the heated air engaging the central part of the trough passes outwardly along the trough, and in this way also heats the water in the ends of the trough and prevents it from freezing.

Part of the air heated by the lamp passes laterally of the trough and then upwardly through the tubular member 58. The shield 72 as described above encompasses a substantial portion of the cross sectional area of the tubular element 58 and thereby retains much of the heated air under the shield and in contact with the upper surface of the drinking trough. This is another means of heating the water in the trough.

Another advantage of the shield 72 is that the heated air retained thereunder is in contact with the conduit 44 and aids in preventing freezing of the conduit. This heat is conducted along the conduit, tending to keep the whole conduit free of ice.

The heated air which eventually passes over the periphery of the shield 72 comes into contact with the central portion of the under surface of the container 34 and thereby retards freezing of the water in the container at the point where the conduit 44 communicates therewith. For this reason, even if there is ice formed in the upper portion of the container 34, the conduit 44 may yet be open and water can pass therethrough into the drinking trough.

The air which passes upwardly in the tubular element 58 then passes outwardly through the openings 62 and travels outwardly along the bottom of the container 34, and upwardly through the annular space 35 to aid in warming the water in the container. The heated air then passes across the top of the container and eventually out through the opening 78. The tubular extension 80 surrounding the opening 78 prevents the rapid discharge of heated air through the opening, and retains it at the top of the container 34 to further aid in imparting heat to the water in the container.

The float 52 is positioned under the valve member 50 and when the water in the trough 40 raises to the desired level, the float pushes the valve member 50 into sealing engagement with the lower end of the conduit 44. Tight sealing engagement is assured because any foreign matter on the valve member 50 will be washed off by the downflow of water through the conduit.

The plunger or agitator 48 secured to the valve member 50 is moved up and down through the conduit 44 on movement of the valve member 50. The upper end of the plunger 48 serves to break any ice formation which may tend to form on the upper end of the conduit 44.

While I have herein shown and described a preferred embodiment of my invention, manifestly it is susceptible of modification and rearrangement of the parts without departing from the spirit and scope thereof. I do not, therefore, wish to be understood as limiting my invention to the precise form herein disclosed, except as I may be so limited by the appended claims.

I claim as my invention:

1. A device of the class described, comprising an outer shell, a water container mounted in the upper part of the outer shell with an annular space between said shell and container communicating with the lower part of the shell, a trough mounted in said shell below said container, means providing communication between said container and trough, said shell having an opening in register with said trough, and a baffle member in the lower part of said shell, said baffle member forming a tubular passage from said trough to the under surface of said container, the upper portion of said baffle member having an opening therein providing communication between said tubular passage and said annular space.

2. A device of the class described, comprising, an outer shell, a water container mounted in the upper part of the outer shell with an annular space between said shell and container communicating with the lower part of the shell, a trough mounted in said shell below said container in spaced relation to the bottom of the shell for placement of heating means therebelow, said shell having an opening in register with said trough, means providing communication between said container and trough, and a baffle member in the lower part of said shell, said baffle member substantially enclosing a portion of the open side of said trough for isolating it from the interior of the shell and exposing it to the exterior of the shell through said opening, and said baffle member forming a tubular passage from said trough to the under surface of said container, said tubular passage having a dimension greater than said trough transversely of the trough, the upper portion of said baffle member having an opening therein providing communication between said tubular passage and said annular space.

3. A fountain comprising, an outer shell, a water container supported in the upper part of said shell with an annular space between said shell and container, a trough supported in said shell below said container and above the bottom of said shell, means providing communication between said container and trough, said shell having an opening in register with said trough, and a vertical tubular element below said container, said tubular element having a transverse slot in the lower end of the side walls thereof, said tubular element being disposed with said trough positioned in and extending through one side of said slot adjacent the top of said slot, the portions of the walls of said tubular element defining the vertical edges of said slot extending downwardly to the bottom of said shell, and vertical plates secured in said shell above the upper edges of the portion of said trough disposed outwardly of said tubular element, said plates cooperating with said tubular element to isolate said portion of said trough from the interior of said shell and exposing it to the exterior of said shell through said opening.

4. A fountain comprising, an outer shell, a water container supported in the upper part of said shell with an annular space between said shell and container, a trough supported in said shell below said container and above the bottom of said shell, means providing communication between said container and trough, said shell having openings on opposite sides thereof, in register with said trough, and a vertical tubular element below said container, said tubular element having a transverse slot in the lower end of the side walls thereof, said tubular element being disposed with said trough positioned in and extending through said slot adjacent the top of said slot, the portions of the walls of said tubular element defining the vertical edges of said slot extending downwardly to the bottom of said shell, and vertical plates secured in said shell above the upper edges each portion of said trough disposed outwardly of said tubular element, said plates cooperating with said tubular element to isolate the respective portions of said trough from the interior of said shell and exposing them to the exterior of said shell through said openings.

5. A fountain comprising, a shell, a water container mounted in the upper part of said shell, a trough mounted in the lower part of said shell in spaced relation to the bottom of the shell, said shell having openings therein in register with said trough, a tubular element extending from said trough to adjacent the under surface of said container, said tubular element being open at top and bottom and having a dimension greater than said trough transversely of the trough, a conduit in said tubular element communicating between said container and said trough, a valve member for closing the lower end of said conduit, a plunger secured to said valve member and extending into said conduit, and a float in said trough, said float being adapted to engage said valve member and seat the latter against said conduit, said plunger being moved in said conduit on movement of said valve member.

6. A fountain comprising, a shell, a water container mounted in the upper part of said shell, a trough mounted in the lower part of said shell in spaced relation to the bottom of the shell, said shell having openings therein in register with said trough, a tubular element extending from said trough to adjacent the under surface of said container, said tubular element having a greater dimension than said trough in a direction transversely of said trough, a conduit in said tubular element communicating between said container and said trough, and a horizontally disposed shield secured to said conduit adjacent to and above said trough, said shield covering a substantial portion of the horizontal area of said tubular element.

7. A fountain comprising, a shell, a water container mounted in the upper part of said shell, a trough mounted in the lower part of said shell in spaced relation to the bottom of the shell, said shell having openings therein in register with said trough, a tubular element extending from said trough to adjacent the under surface of said container, a conduit in said tubular element communicating between said container and said trough, and a horizontally disposed cone-shaped shield secured to said conduit adjacent to and above said trough, said shell having a dimension greater than said trough transversely of the trough, the concave side of said cone-shaped shield being directed downwardly.

8. In a hog fountain, an outer shell, a water container in the upper part of the shell, said shell having openings in the opposite side walls thereof below said container and above the bottom of the shell, a trough extending transversely across the shell and supported in said openings, wall elements substantially enclosing the ends of said trough and isolating said ends from the interior of the shell and exposing them through said openings to the exterior of the shell, there being a space below said trough for positioning a heating means, and baffle means for directing a portion of the air heated by said heating means upwardly into contact with the central portion of the under surface of said container.

9. A fountain comprising, an outer shell, a water container mounted in the upper part of the shell with an annular space between said shell and container, a trough in the lower part of the shell adapted to receive water from said container, there being a space below said trough for placement of heating means, and a cover for covering said shell in spaced relation above said container, said cover having a central opening and an open tubular member surrounding and depending downwardly from said central opening.

10. A fountain comprising, an outer shell, a water container mounted in the upper part of the shell with an annular space between said shell and container, a trough in the lower part of the shell adapted to receive water from said container, there being a space below said trough for placement of heating means, baffle means for directing a portion of the air heated by said heating means into contact with the central portion of the under surface of said container and into said annular space, and a cover for covering said shell in spaced relation above said container, said cover having a central opening and an open tubular member surrounding and depending downwardly from said central opening.

11. A fountain comprising, a shell, a water container mounted in the upper part of the shell, a trough mounted in the lower part of the shell, there being a space below said trough for placement of heating means, a conduit communicating between said container and trough, a horizontally disposed shield secured to said conduit adjacent the lower end thereof, said shell being positioned above said trough and having a dimension greater than said trough transversely of the trough, said shield adapted to retain air heated by said heating means adjacent the lower end of said conduit, a plunger in said conduit, and a float in said trough having operative association with said plunger, said plunger being actuated in said conduit on movement of said float.

12. A fountain comprising, an outer shell, a water container mounted in the upper part of the shell, a trough mounted in the lower part of said shell, there being a space below said trough for placement of heating means, a vertical conduit communicating between said container and trough, a tubular element extending between said container and trough and surrounding said conduit, said tubular element having a relatively long and short transverse dimension and being positioned with its long transverse dimension disposed transversely to said trough, the ends of said trough extending outwardly beyond said tubular element, the portions of said tubular element disposed laterally of said trough extending downwardly to a position adjacent the bottom of said shell, and a horizontally disposed shield secured to said conduit adjacent the lower end thereof, said shield generally conforming in shape with the cross sectional contour of said tubular element and encompassing a substantial portion of the cross sectional area of said tubular element.

13. A fountain comprising, a shell, a water container mounted in the upper part of said shell, a trough mounted in the lower part of said shell in spaced relation to the bottom of the shell, and a vertical tubular element in the lower part of said shell extending between said trough and container, said tubular element being generally oval in horizontal cross section and being positioned with its long transverse dimension disposed transversely of said trough, the portions of said tubular element disposed laterally of said trough extending to the bottom of said shell.

14. A fountain comprising, an outer shell, a water container mounted in the upper part of the shell, with an annular space between said shell and container, a trough mounted in the lower part of said shell, there being a space below said trough for placement of heating means, a vertical conduit communicating between said container and trough, a tubular element extending between said container and trough and surrounding said conduit, the upper end of said tubular element having an opening therein for communication between said tubular element and said annular space, said tubular element having a relatively long and short transverse dimension and being positioned with its long transverse dimension disposed transversely to said trough, the ends of said trough extending outwardly beyond said tubular element, the portions of said tubular element disposed laterally of said trough extending downwardly to a position adjacent the bottom of said shell, and a horizontally disposed shield secured to said conduit adjacent the lower end thereof, said shield generally conforming in shape with the cross sectional contour of said tubular element and encompassing a substantial portion of the cross sectional area of said tubular element.

MAX L. RYSDON.

REFERENCES CITED

The following references are of record in the file of this patent:

UNITED STATES PATENTS

| Number | Name | Date |
|---|---|---|
| 633,554 | Magee | Sept. 19, 1899 |
| 1,060,972 | Crockford | May 6, 1913 |
| 1,211,054 | Bernard | Jan. 2, 1917 |
| 1,220,404 | Eaton | Mar. 27, 1917 |
| 1,269,874 | Soucy | June 18, 1918 |
| 1,394,617 | Gogerty | Oct. 25, 1921 |
| 2,097,719 | Brembeck | Nov. 2, 1937 |